United States Patent [19]

Kohno

[11] Patent Number: 5,840,121
[45] Date of Patent: *Nov. 24, 1998

[54] APPARATUS FOR PRODUCING ENCAPSULATED SEEDS

[75] Inventor: Yasushi Kohno, Shizuoka, Japan

[73] Assignee: Yazaki Corporation, Tokyo, Japan

[*] Notice: The term of this patent shall not extend beyond the expiration date of Pat. No. 5,509,963.

[21] Appl. No.: 704,830

[22] Filed: Aug. 28, 1996

[30] Foreign Application Priority Data

Aug. 29, 1995 [JP] Japan ................................ 7-220276

[51] Int. Cl.$^6$ ........................................ A23G 3/00
[52] U.S. Cl. .................. 118/13; 118/26; 118/30; 118/400; 118/407
[58] Field of Search ................ 118/13, 26, 30, 118/400, 407; 427/4

[56] References Cited

U.S. PATENT DOCUMENTS 5,254,358  10/1993  Kouno et al. ........................ 427/4
5,509,963  4/1996  Kohno ................................ 118/23

*Primary Examiner*—Laura Edwards
*Attorney, Agent, or Firm*—Armstrong, Westerman, Hattori, McLeland & Naughton

[57] ABSTRACT

A suction tip is moved between a seed-attracting position and a seed-releasing position when a rotary member is rotated by a drive source. The suction tip is moved upwardly and downwardly by an actuator attached to the rotary member. A gel-discharging mechanism disposed in alignment with the seed-releasing position includes a reciprocatable piston. When the piston moves front, a pressure is applied on gel, by which a hollow nozzle plunger opens a valve to allow the discharge of the gel. When the piston moves back, gel is supplemented. A portion of the gel discharged drops by its own weight, while the remainder forms a gel layer that closes the lower end of the hollow nozzle plunger. At the seed-releasing position, the suction tip is driven by the actuator to be lowered into the hollow portion to release the seed on the gel layer. Extremely small seeds can be reliably supplied on the gel layer at the lower end of the hollow portion.

5 Claims, 10 Drawing Sheets

F I G. 6
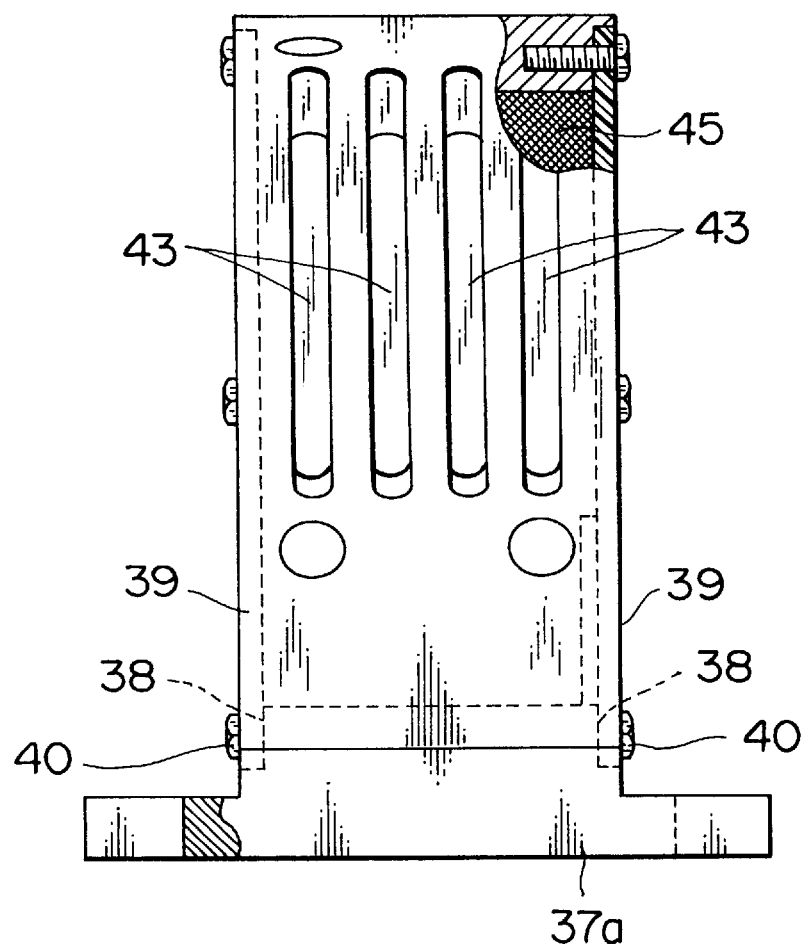

5,840,121

APPARATUS FOR PRODUCING ENCAPSULATED SEEDS

BACKGROUND OF THE INVENTION

1. Field of the Invention

This invention relates to an apparatus for producing encapsulated seeds, and more particularly to an apparatus for producing encapsulated seeds in which seeds are coated and protected with a gel containing nutrients, sterilizers and the like, and in which seeds, coated with such gel, becomes sphericalized and large in diameter to facilitate their sowing.

2. Description of the Related Art

An encapsulated-seed producing apparatus of this type conventionally includes a gel discharging mechanism and a seed supplying mechanism. The gel discharging mechanism B, as shown in FIGS. 9 and 10, comprises in outline a valve main body 1 substantially rectangular in cross-section. The valve main body 1 has an open portion 2 formed therein and a piston-insertion hole 14 (FIG. 10) extending from the open portion 2 to the outside, into which is reciprocatable inserted a piston 77, the piston being reciprocated by a drive source not shown. A pipeway extends from an opening 3 at the lower end of the valve main body 1 to a not-shown gel-storing tank; between the opening 3 and the open portion 2 is arranged a check valve for opening and closing the opening 3, the check valve being comprised of a steel ball 4 and a spring that urges the steel ball against the opening 3; and a valve casing 5 is mounted at the left side of the valve main body 1.

The valve casing 5 has a plunger-insertion hole 6 vertically extending therethrough, at the lower end of which is formed a valve seat 6a. A bushing 7 is fitted inside the plunger-insertion hole 6 and in the bushing 7 is vertically movably inserted a hollow nozzle plunger 8. The nozzle plunger 8 has at the lower half thereof an outer periphery reduced in diameter to provide a pressure-receiving surface 8a. A gel flow channel 9 is provided to communicate the plunger-insertion hole 6 and the open portion 2, so that the gel fed from the gel-storing tank to the open portion 2 via the opening 3 and the check valve fills the gel flow channel 9 and the plunger-insertion hole 6.

On its top surface the valve casing 5 is provided with a cylindrical portion 10 with a hollow interior in alignment with the plunger-insertion hole 6. The cylindrical portion 10 is at its outer periphery formed with a male screw 10a, and a spring adjuster 11 with a corresponding female screw 11a formed on its inner periphery is threaded over the male screw 10a. A spring receiver 12 is mounted at the upper end of the nozzle plunger 8, and a spring 13 is interposed between the spring receiver 12 and the spring adjuster 11 to urge the nozzle plunger 8 downwardly. The lower end of the nozzle plunger 8 is thus normally seated on the valve seat 6a to close the valve. As the reciprocation piston moves front so as to pressurize the gel inside the gel flow channel 9, the gel presses the pressure-receiving surface 8a to move the nozzle plunger 8 upwardly and open the valve, thereby causing the gel to be discharged. As the reciprocation piston moves back and the pressure on the gel in the gel flow channel 9 is reduced, the nozzle plunger 8 is urged downwardly by the spring 13 to close the valve, while causing additional gel to be supplied from the gel-storing tank into the gel flow channel 9.

If the nozzle plunger 8 is lowered to close the valve, the discharge of the gel is stopped, while at the same time the gel that remains at the underside of the valve seat forms a layer of gel by the surface tension, which closes the lower end of the plunger-insertion hole 6 and droops by its own weight. In synchronism with this, a seed is dropped from a later-described seed-supplying mechanism onto the gel layer, and the seed is coated therewith and on the subsequent opening of the valve drops downwardly to a curing vessel (not shown) together with the gel added, while sphericalized due to the surface tension during falling.

As the seed-supplying mechanism, there can be mentioned one in which a hollow suction tip with a tapered end is fitted at an end of a rotary arm, with the tapered end directed downwardly, the rotary arm being rotationally driven by a rotary actuator. The suction tip is at its rear end communicated via a selector valve to positive and negative pressure sources. A seed vessel, which is movable upwardly and downwardly, is provided right below one of the rotary positions between which the suction tip is rotated, and a gel-discharging mechanism is provided so that the nozzle plunger 8 as mentioned above is positioned right below the other one of the rotary positions.

In this mechanism, the seed vessel is moved upwardly so that the tapered end of the suction tip is inserted among a number of seeds in the seed vessel, at which time the pressure inside the suction tip is made negative to vacuum-attract a seed thereto. Thereafter, the rotary arm is rotated to bring the suction tip to the rotary position above the gel-discharging mechanism, followed by cancelling the negative pressure or supplying a positive pressure inside the suction tip to drop the seed through the nozzle plunger 8 onto the gel layer. This type of encapsulated-seed producing apparatus makes it possible to automatically continuously coat seeds by synchronizing the seed-supplying and gel-discharging mechanisms with each other.

In the conventional seed-supplying mechanism as mentioned above, the vacuum-attraction of a seed is stopped at a position above the gel-discharging mechanism by liberating the suction tip from negative pressure or supplying positive pressure to the suction tip, and the seed undergoes free-fall through the hollow portion of the nozzle plunger so as to be supplied. With such a seed-supplying mechanism, there arises no problem in seed-supplying as far as the seeds to be supplied have a certain degree of size and mass since they can smoothly drop onto the gel layer formed at the lower end of the hollow portion of the nozzle plunger.

There arises a problem, however, when extremely small seeds such as seeds of flowers are to be supplied, that seeds become unstable in their free-fall. As a result, in a mechanism in which the timing until the discharge of gel is regulated by a timer such as a sequencer, it becomes difficult to time the supply of a seed and the discharge of gel, and if timed in one way or another, the efficiency of processing will be lowered.

SUMMARY OF THE INVENTION

This invention has been accomplished to overcome the above drawbacks and an object of this invention is to provide an apparatus for producing encapsulated seeds which enables extremely small seeds such as seeds of flowers to be reliably supplied onto the gel layer formed below the nozzle plunger.

In order to attain the object described above, according to this invention, there is provided an apparatus for producing encapsulated seeds, which comprises: a seed-supplying mechanism and a gel-discharging mechanism, the seed-supplying mechanism comprising a rotary member; an actuator attached to the rotary member; a suction tip vertically movably driven by the actuator; a rotary drive source for driving the rotary member such that the suction tip is moved between a seed-attracting position and a seed-releasing position; and a seed vessel containing seeds to be attracted to the suction tip, which is disposed corresponding to the seed-attracting position, the gel-discharging mechanism disposed corresponding to the seed-releasing position and comprising a gel flow channel filled with gel; a piston-insertion hole communicating to the gel flow channel; a piston reciprocatably inserted into the piston-insertion hole, which piston, when moving front, pressurizes the gel inside the gel flow channel and, when moving back, causes additional gel to flow into the gel flow channel; a nozzle plunger with a hollow portion axially extended therethrough, which nozzle plunger opens a valve when the gel is pressurized to allow gel to be discharged, a portion of the gel discharged dropping by its own weight and the remainder forming a layer of gel that closes the hollow portion at a lower end thereof; and a drive source for reciprocating the piston, wherein at the seed-attracting position the suction tip vacuum-attracts a seed from the seed vessel of the seed-suppying mechanism and at the seed-releasing position, the suction tip is moved downwardly by the actuator into the hollow portion of the nozzle plunger to release the seed attracted thereto on the layer of gel.

In the above construction of this invention, the suction tip—which is upwardly and downwardly movably driven by the actuator attached to the rotary member—moves between the seed-attracting position and the seed-releasing position through the rotation of the rotary member by the drive source. The seed-supplying mechanism disposed corresponding to the seed-attracting position has a seed vessel containing seeds to be vacuum-attracted by the suction tip. The gel-discharging mechanism disposed corresponding to the seed-releasing position includes the gel flow channel, the piston, the hollow nozzle plunger, and the drive source.

When the piston is moved front inside the piston-insertion hole which is in communication with the gel flow channel filled with gel, a pressure is given on the gel inside the gel flow channel, and when the piston moves back, additional gel is introduced into the gel flow channel. The pressurization of the gel inside the gel flow channel moves the hollow nozzle plunger upwardly to allow the discharge of gel. A part of the gel discharged gravitationally drops, while the remainder of the gel forms a gel layer and closes the lower end of the hollow portion.

The suction tip, at the seed-attracting position, vacuum-attracts a seed from the seed vessel of the seed-supplying mechanism and, at the seed-releasing position, is driven by the actuator and lowered into the hollow portion of the nozzle plunger to release the seed attracted thereto onto the gel layer.

Thus, with the encapsulated-seed producing apparatus, a seed is released on the gel layer at a position close thereto and is not subjected to free-fall to be supplied. Accordingly, even extremely small seeds such as seeds of flowers can be reliably supplied onto the gel layer in concurrence with the timing of the discharge of gel.

It is preferred to provide a plurality of actuators at the rotary member at positions symmetrical relative to an axis of rotation of the rotary member and a corresponding number of suction tips each individually upwardly and downwardly driven by a related one of the actuators. In this case, the operations of attracting and releasing seeds can be conducted in parallel at one time, leading to an increased efficiency in the production of encapsulated seeds.

Further, it is preferred to stop the supply of negative pressure and, instead, supply positive pressure to the suction tip or tips when the suction tips, at the seed-releasing position, have moved downwardly into the hollow portion of the nozzle plunger. In this case, seeds can be more reliably supplied on layers of gel, thereby preventing the production of capsules with no seeds contained therein.

The above and other objects, features and advantages of this invention will become apparent from the following description and the appended claims, taken in conjunction with the accompanying drawings in which like parts or elements are denoted by like reference characters.

BRIEF DESCRIPTION OF THE DRAWINGS

FIG. 6 is a side view of the seed-containing casing as shown in FIG. 5;

DESCRIPTION OF THE PREFERRED EMBODIMENT

Embodiments of the apparatus A for producing encapsulated seeds according to the present invention will now be described with reference to the attached drawings.

Figure 1:
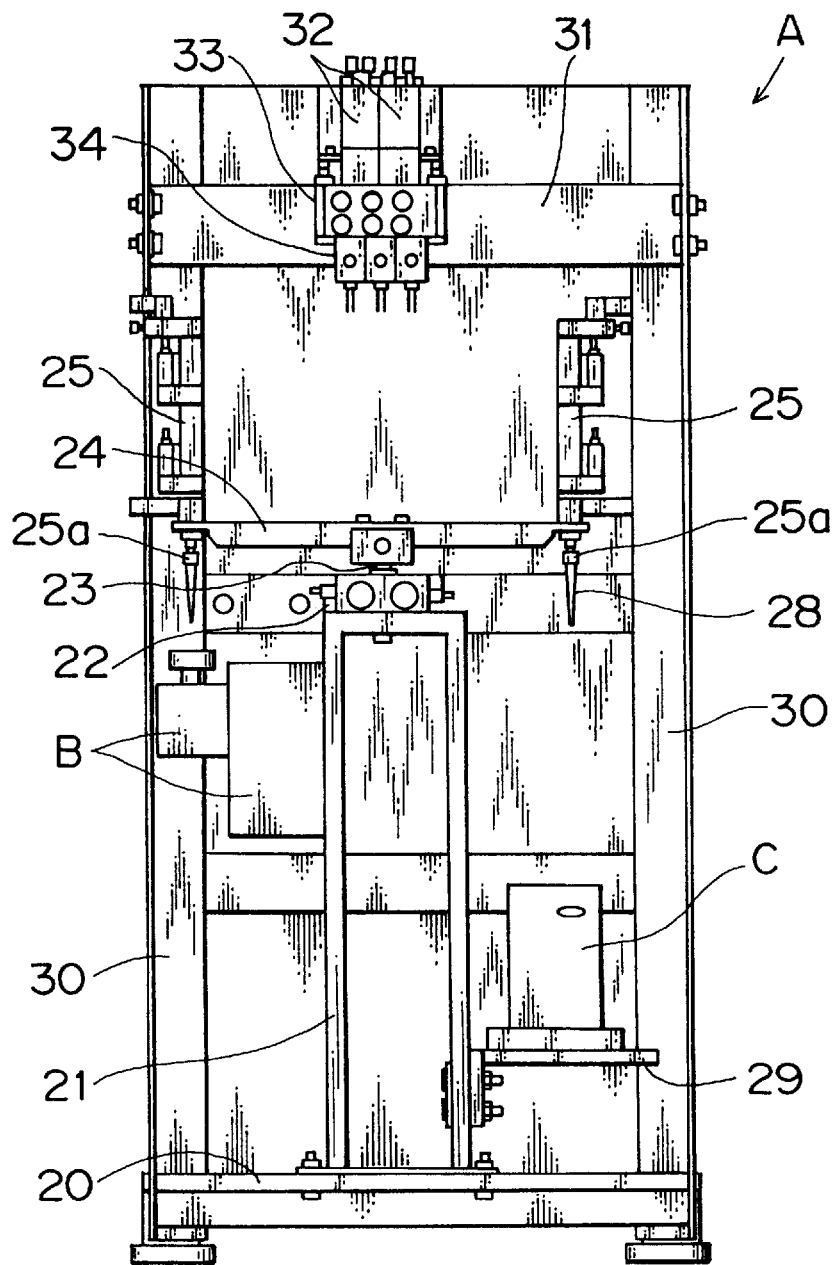
FIG. 1 is a front view of an apparatus for producing encapsulated seeds according to this invention.
Figure 2:
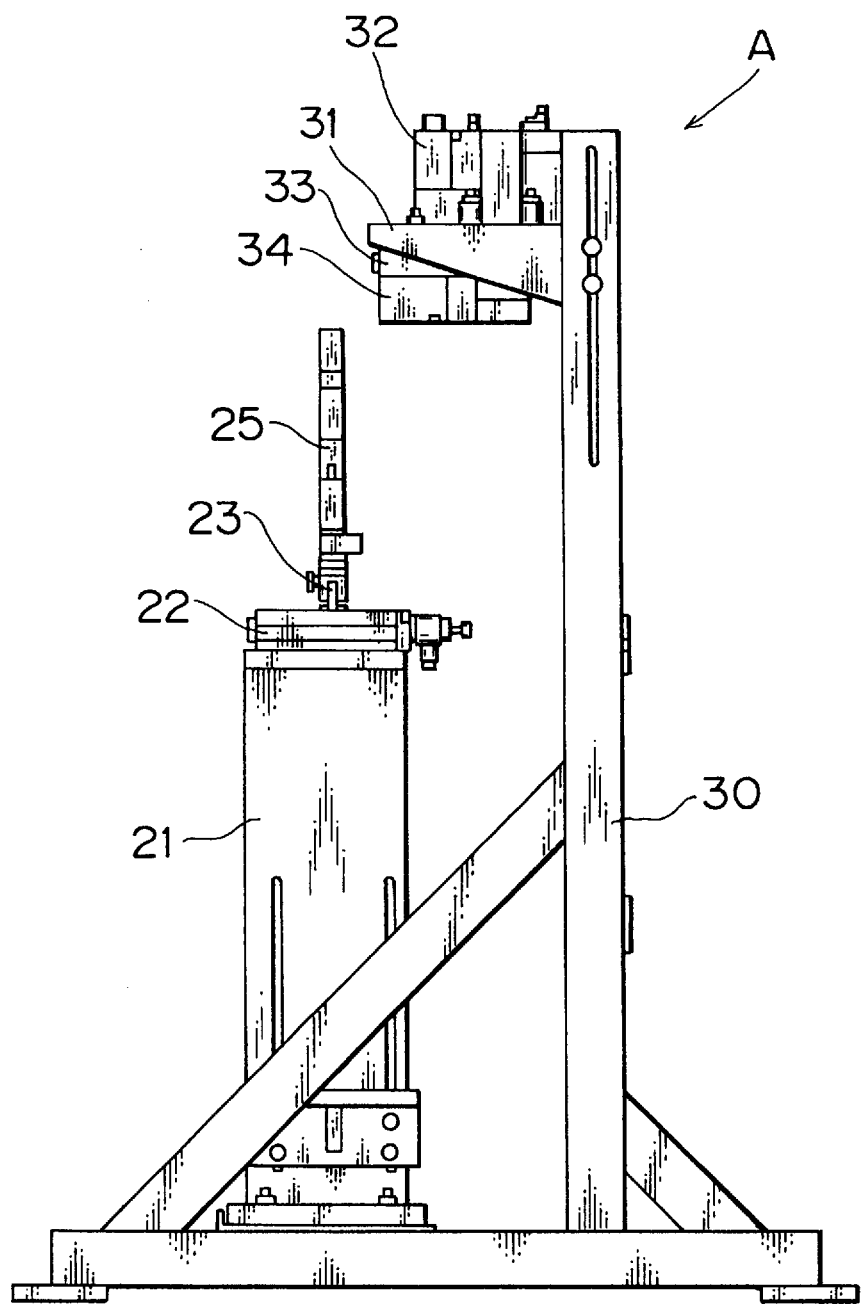
FIG. 2 is a side view of the apparatus as shown in FIG. 1.
Figure 3:
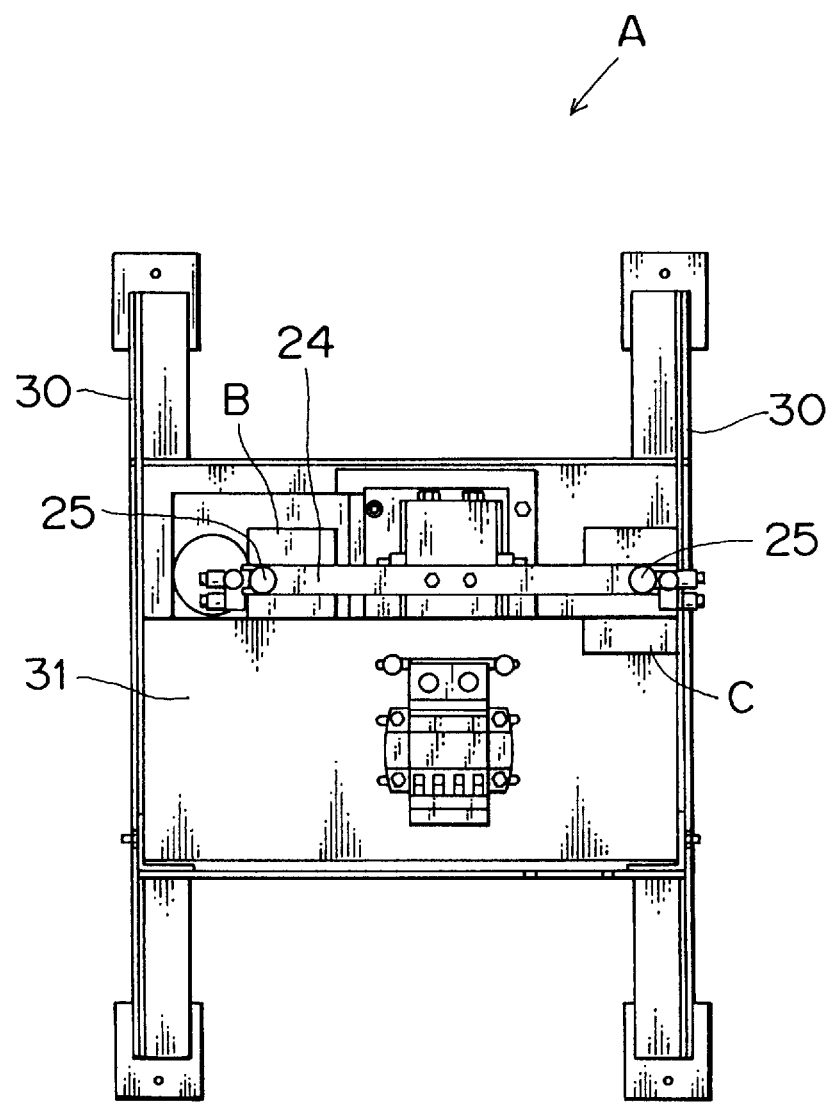
FIG. 3 is a plan view of the apparatus as shown in FIG. 1.

Reference is made to FIGS. 1 to 3. In FIG. 1, a mount table 21 is bolted to the top surface of a base plate 20, which mount table has a thin-type rotary actuator 22 as a rotational drive source mounted on its top surface. The rotary actuator 22 is of an air-driven type, and its rotation by 180° is detected by a not-shown sensor. This actuator, however, may be replaced by an actuator of a stepping-motor type, in which case its drive angle can be accurately regulated by the number of drive pulses or a sensor.

Figure 4:
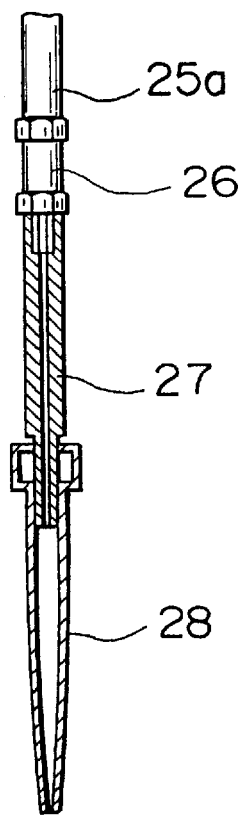
FIG. 4 is a partially sectional front view of an essential portion of the apparatus as shown in FIG. 1.

A rotary shaft 23 extends from the rotary portion of the rotary actuator 22, to which rotary shaft is fixedly bolted a rotary arm 24 as a rotary member at an intermediate portion thereof. Air cylinders 25 as actuators are attached at opposite ends of the rotary arm 24, with their piston rods 25a directed downwardly. Each piston rod 25a, as shown in FIG. 4, is at the front end provided with a pipe fitting 26 to the front end of which is connected a short pipe 27. A suction tip 28 is detachably fitted to the front end of the short pipe 27.

The suction tip 28 is made of plastic material and provided in the form of a tapered hollow tube whose diameter becomes smaller towards its front end. The suction tip 28 is detachably fitted to the short pipe 27 through the elasticity of its plastic material. The suction tip 28 has a hole at its front end which is of such size as to be blocked by one seed and can be replaced in accordance with the size of the seed to be vacuum-attracted.

Figure 9:
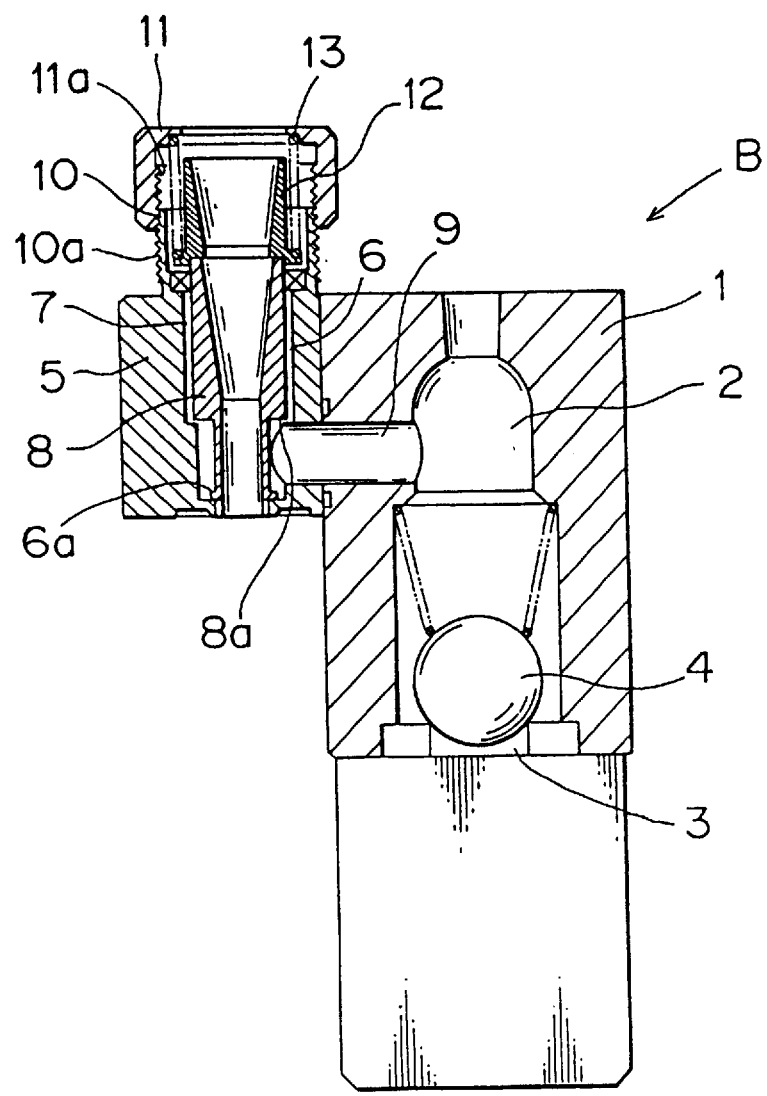
FIG. 9 is a longitudinal sectional view of an essential portion of a conventional gel-discharging mechanism.
Figure 10:
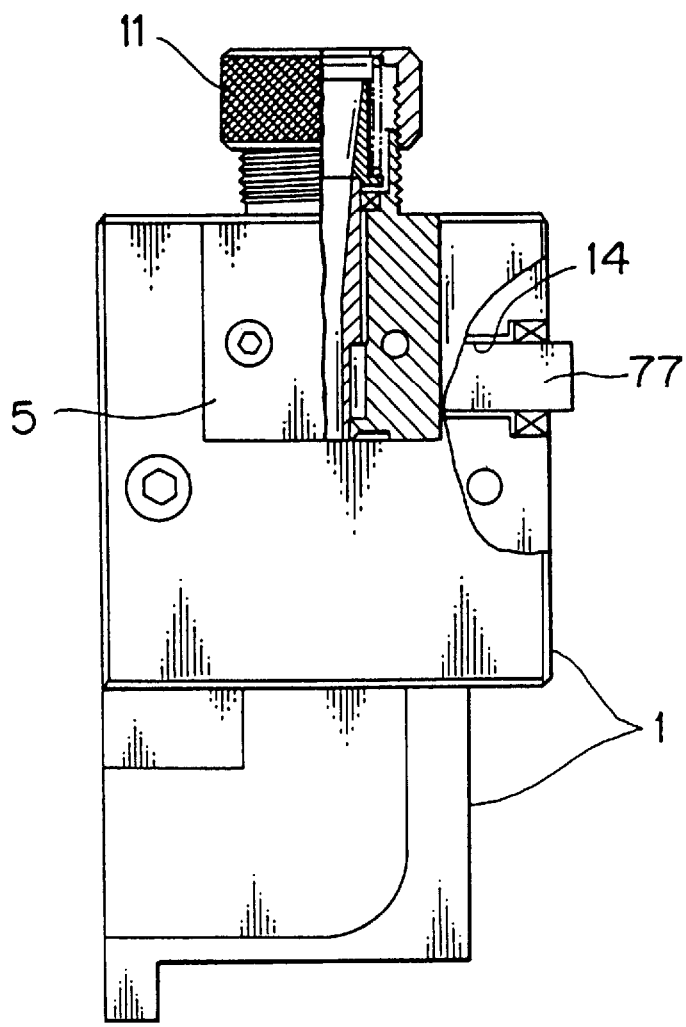
FIG. 10 is a front view of the gel-discharging mechanism as shown in FIG. 9.

Reverting to FIG. 1, the same gel-discharging mechanism B as described in connection with FIGS. 9 and 10 is mounted at the left side of the mount table 21, and a seed-containing casing C is mounted on a mount 29 provided at the right side of the mount table 21. Two frames 30 are provided upright on the base plate 20, which frames are at an upper portion connected with each other by a unit mount 31.

To the unit mount 31 are fixed pressure sources 32 that generate positive and negative pressures; a manifold 33 connected to positive- and negative-pressure supplying paths of the pressure sources 32; and a plurality of selector valves 34 are connected to respective outlets of the manifold 33. The selector valves 34 are connected via not-shown hoses to the rotary actuator 22, air cylinders 25, pipe fittings 26 of the suction tips 28 (FIG. 4), and an air injection nozzle 52 of the seed-containing casing C (FIG. 5).

Figure 5:
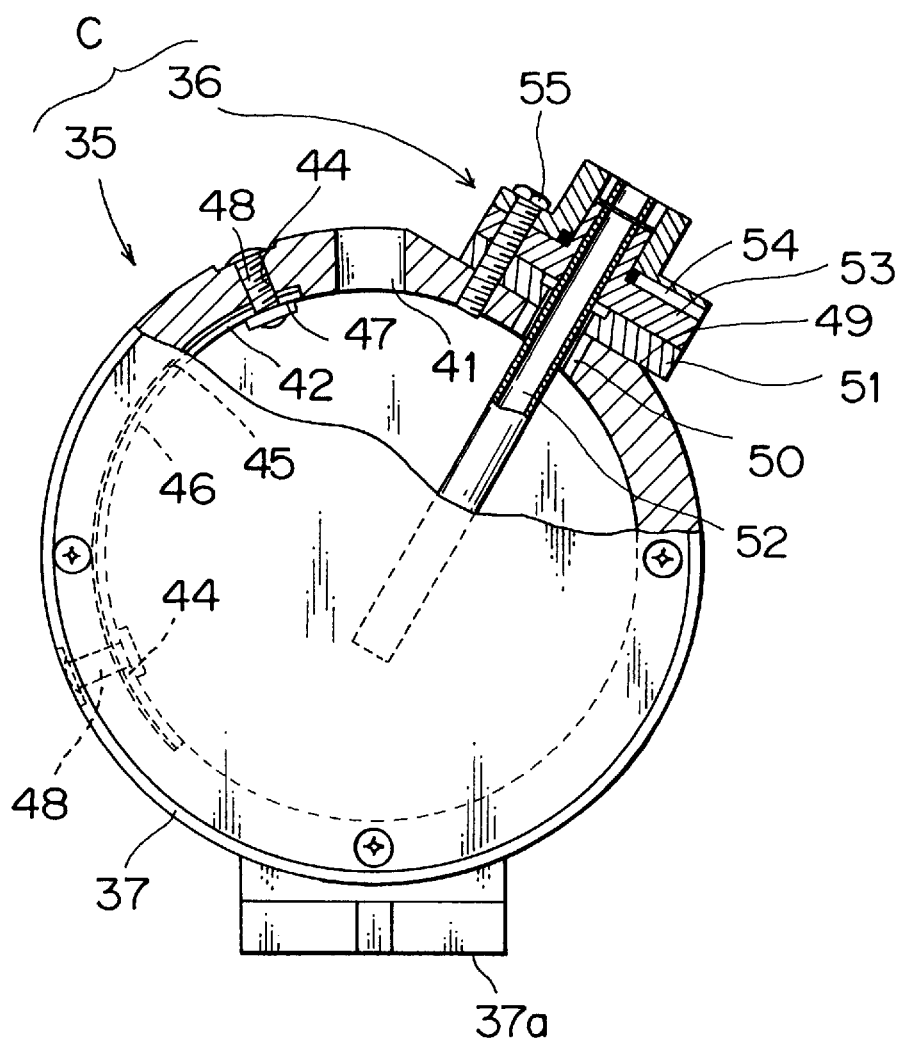
FIG. 5 is a partially sectional front view of a seed-containing casing according to this invention.

FIGS. 5 and 6 show an example of the seed-containing casing C which constitutes the seed-supplying mechanism together with the rotary actuator 22, rotary arm 24, air cylinders 25, suction tips 28 and so forth, and which is comprised of a seed vessel 35 and a stirring mechanism 36. The seed vessel 35 has a cylindrical case 37 and a stand 37a provided at a lower portion of the case 37. The cylindrical case 37 is at opposite end surfaces thereof provided circumferentially with annular step portions 38, each having a cover 39 fitted therein by bolts 40. Each cover 39 is formed from transparent plastic material so that the seeds floating inside the case 37 can be readily observed from outside.

The case 37 is in an upper portion thereof provided with an opening 41 which is positioned right below a suction tip 28. Along an inner circumferential surface at the left side of the case 37 in FIG. 5 is provided a cut-off portion 42. Four air slots 43 are provided in the area where the circumferential wall has been made thin by the cut-off portion 42, the air slots being arranged in a row in an axial direction of the case 37. At four corners in the made-thin area are provided holes 44. A net 45 is arranged so as to cover the inner surface of the made-thin area and held in place by a net holder 46.

The net holder 46 is at positions in alignment with the air slots 43 provided with air slots of the same shape as that of the air slots 43, and at positions in alignment with the holes 44 provided with holes 47. The net holder 46 is securely fixed in place by rivets 48 which advance into both holes 44 and 47. The net 45 allows the air inside the case 37 to pass therethrough and thus the air slots 43, but prevents the seeds inside the case 37 from passing therethrough.

The tip of the air injection nozzle 52 is positioned above the seeds contained in the case 37, and the injection of air from the air injection nozzle 52 causes seeds to be stirred and float upwardly, while letting air be discharged through the net 45 and air slots 43 to the outside.

Although in the above-mentioned seed-containing casing C, seeds are stirred by the air injected, it is also possible to employ a structure in which the seed vessel 35 is supported on and vibrated by an electrically-driven or air-driven vibration-generating machine to cause seeds inside the vessel to be stirred and float.

The operation of the thus constructed apparatus for producing encapsulated seeds will now be described.

One of the suction tips 28 (the right one in FIG. 1) is positioned right above the opening 41 in the case 37 of the seed vessel 35 which contains a large number of seeds, while the other suction tip 28 (the left one in FIG. 1) is positioned right above the nozzle plunger 8 of the gel-discharging mechanism.

If air is injected from the air injection nozzle 52, the seeds inside the case 37 are stirred and a part thereof floats upwardly. In the meantime, the air cylinder 25 on the right side in FIG. 1 is operated to move the related rod 25a downwardly so that the suction tip 28 passes through the opening 41 into the case 37 and stops there, at which time the selector valve 34 is operated and the suction tip 28 is communicated to the negative pressure source, followed by making negative the pressure inside the suction tip 28.

Spaces between seeds floating inside the case 37 become greatly larger than spaces between the seeds in accumulation on the bottom of the case 37, resulting in one or two seeds coming closest to the suction tip 28. Besides, a floating seed is readily moved even by small force of suction. Thus, a seed at a position nearest to the suction tip 28 is vacuum-attracted to the suction tip and closes the hole at the front end thereof, thereby causing the pressure inside the suction tip 28 to go negative to an increased degree and keeping other seeds from being vacuum-attracted.

Then, a not-shown pressure sensor provided at the negative pressure source detects the increase in the negative degree inside the suction tip 28 and emits a signal by which the air cylinder 25 is operated to move the rod 25a and thus the suction tip 28 upwardly. The rotary actuator 22 is then rotated by 180° to bring the suction tip 28 with a seed sucked thereto to the position just above the nozzle plunger 8 of the gel-discharging mechanism B, and the other suction tip 28 to the position just above the opening 41 in the case 37.

The suction tip 28 with a seed sucked thereto, which is positioned just above the nozzle plunger 8 of the gel-discharging mechanism B, is moved downwardly like the other suction tip 28 above the opening 41 in the case 37 when the air cylinder 25 is operated, so that the suction tip advances into the hollow portion of the nozzle plunger 8 of the gel-discharging mechanism B. When the suction tip 28 has advanced into the hollow portion of the nozzle plunger 8, the selector valve 34 is switched to stop the supply of negative pressure to the suction tip 29 and supply positive pressure so that the seed is dropped and supplied onto the gel layer formed below the nozzle plunger 8. Concurrently, the other suction tip 28 passes through the opening 41 into the case 37 and vacuum-attracts a seed thereto.

In the above example, positive pressure is supplied to the suction tip 28 for dropping the seed onto the gel layer, but this is not a must. The release of the seed, however, can be reliably effected by supplying positive pressure.

After the seed is supplied on the gel layer, the nozzle plunger 8 is lifted to allow gel to be discharged on top of the gel layer to enclose the seed and air bubbles therein. The gel layer increased in weight by the addition of the gel drops to a curing vessel while sphericalized during its falling.

As described above, by operating the seed-supplying mechanism and the gel-discharging mechanism of the capsulated-seed producing apparatus in synchronism with each other, the processing of coating seeds can be automatically continuously conducted.

The order of positioning the suction tips of the seed-supplying mechanism will now be described with reference to FIGS. 7A to 7F, in each of which the lower side of the rotary arm 24 stands for the seed-attracting position and the upper side the seed-releasing position. The two suction tips 28, 28 provided to the rotary arm 24 are respectively positioned above the seed vessel 35 and above the nozzle plunger 8 of the gel-discharging mechanism B.

Figure 7D:
FIGS. 7A to 7F are explanatory views illustrating the order in which two suction tips of a seed-supplying mechanism are positioned.
Figure 7A:
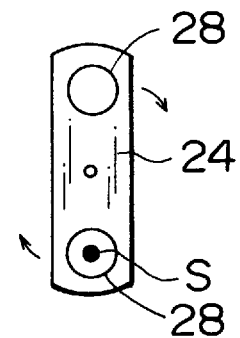

If one of the suction tips 28, due to a negative pressure inside thereof, vacuum-attracts a seed as shown in FIG. 7A (the seed being sucked is shown at character S), the pressure inside the suction tip 28 becomes negative to an increased degree. This is detected by the not-shown pressure sensor, and by a signal therefrom the rotary actuator 22 is operated to rotate via its output shaft the rotary arm 24 in a clockwise direction. On detection by a not-shown positioning sensor that the rotary arm 24 has rotated by 180° and is at a prescribed position, the rotary actuator 22 is inoperated, so that the one suction tip 28 with a seed sucked thereto is positioned above the nozzle plunger 8 and the other suction tip 28 is positioned above the seed vessel 35 as shown in FIG. 7B.

In this position, a seed is vacuum-attracted to the other suction tip 28 in the same manner as described above, as shown in FIG. 7C (the seed being sucked is shown at character S). Concurrently with this, the air cylinder 25 is operated to move, via the rod 25a, the one suction tip 28 downwardly into the hollow portion of the nozzle plunger 8. Then, the supply of negative pressure to the one suction tip 28 is stopped, thereby to release the seed therefrom to be supplied onto the gel layer formed below the nozzle plunger 8. As a result, the seed having been sucked to the one suction tip 28 goes out of sight as shown in FIG. 7D.

Figure 7E:
Figure 7B:
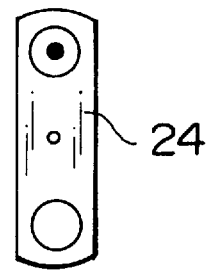
Figure 7F:
Figure 7C:
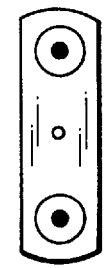

Thereafter, the rotary arm 24 is rotated in a counter-clockwise direction by 180° and stopped at the prescribed position as shown in FIG. 7E with the aid of the not-shown sensor. In this position, the one suction tip 28 above the seed vessel 35 vacuum-attracts a seed thereto, while the other suction tip 28 above the nozzle plunger 8 advances into the hollow portion to release its seed, resulting in the position as shown in FIG. 7F, which means that the rotary arm 24 has returned to its original position.

The entire operation of the thus constructed encapsulated-seed producing apparatus will now be described with reference to FIGS. 8A to 8E. The rotary arm 24 rotates by the rotation of the output shaft of the rotary actuator 22; the rotary actuator 22 stops by a signal from the position detector sensor; and the suction tips 28 are respectively positioned right above the seed-containing casing C and the nozzle plunger 8 of the gel-discharging mechanism B.

Figures 8A, 8B, 8C:
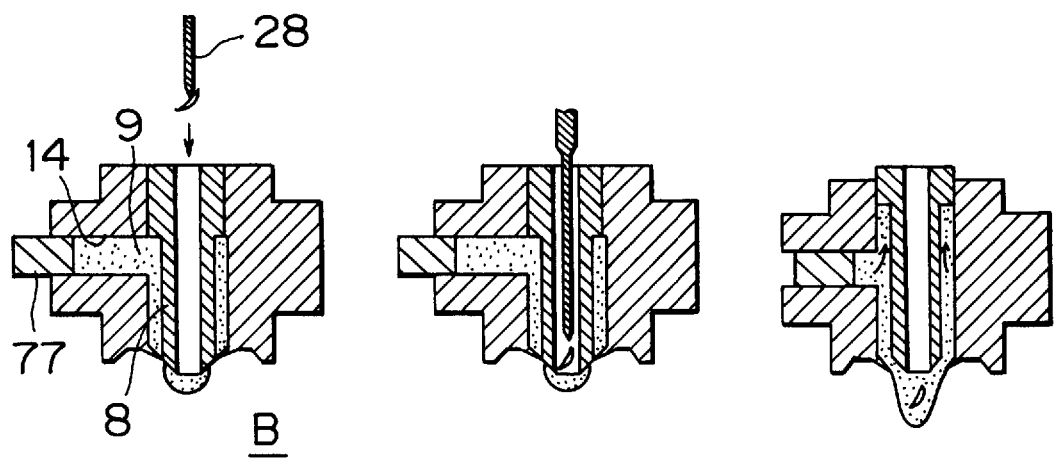
FIGS. 8A to 8E are explanatory views illustrating the operation of an essential portion of the encapsulated-seed producing apparatus according to this invention.

The suction tip 28—which has been stopped and positioned above the nozzle plunger 8 of the gel-discharging mechanism B as shown in FIG. 8A—is moved downwardly through the operation of the air cylinder 25 to a position inside the hollow portion of the nozzle plunger 8, which position is close to the gel layer formed at the lower end of the hollow portion, as shown in FIG. 8B. A positive pressure is then substituted for the negative pressure inside the suction tip 28 to release the seed on the gel layer. On completion of the release of the seed, the suction tip 28 is moved upwardly out of the hollow portion of the nozzle plunger 8 through the operation of the air cylinder 25.

Figures 8D, 8E:
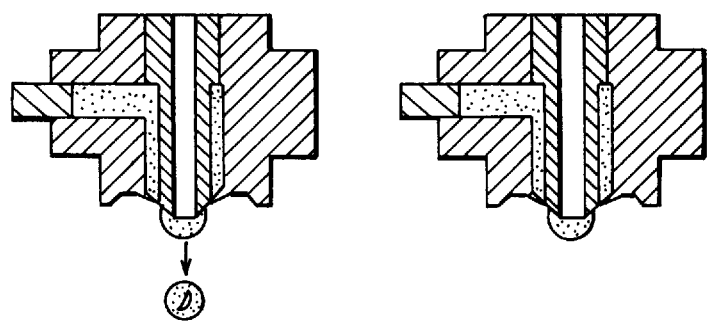

In the gel-discharging mechanism B, if the piston 77 (FIG. 10) moves front as shown in FIG. 8C, the gel in the form of a sol inside the gel flow channel 9 is pressurized, which causes the moving upwardly of the nozzle plunger 8 to allow the discharge of gel. The seed supplied from the suction tip 28 is enclosed with air bubbles in the gel discharged, and the resultant gel layer below the nozzle plunger 8 droops by its own weight. If the piston 77 then moves back as shown in FIG. 8D, the pressure on the gel inside the gel flow channel 9 is reduced, which causes gel to be additionally supplied into the gel flow channel 9 and the nozzle plunger 8 to be closed. The gel with the seed enclosed therein, due to an increase in weight, gravitationally drops to a not-shown curing vessel. The nozzle plunger 8 of the gel-discharging mechanism B and the piston 77 return to their original positions as shown in FIG. 8E.

As described above, a suction tip 28—which can vacuum-attract and release seeds through the operation of a negative negative and positive pressure source—is fitted at a lower end of a vertically-movable actuator such as an air cylinder, which is rigidly fixed to a rotary drive source such as an air rotary actuator. This suction tip 28 is raised and lowered as the air cylinder moves upwardly and downwardly so that its front end is moved inside the hollow portion of the nozzle plunger 8. The suction tip 28, if lowered to the utmost, stops at a position where its front end is close to, but does not contact the gel layer formed below the nozzle plunger 8.

The suction tip 28 advances into the hollow portion of the nozzle plunger 8 to bring the seed sucked thereto to a position just above the nozzle tip of the nozzle plunger to release the seed there onto the gel layer below the nozzle plunger 8. The suction tip 28 now free of the seed is moved upwardly, and then the valve at the lower end of the plunger-insertion hole 6 is opened to allow the discharge of gel. The seed supplied is enclosed with air bubbles in the gel discharged. On the subsequent closing of the valve, the gel layer droops by its own weight and gravitationally drops due to the increase in weight by the addition of the gel.

Having now fully described the invention, it will be apparent to one of ordinary skill in the art that many changes and modifications can be made thereto without departing from the spirit and scope of the invention as set forth herein.

What is claimed is:

1. An apparatus for producing encapsulated seeds comprising:
   a seed-supplying mechanism connected to a gel-discharging mechanism;
   said seed-supplying mechanism comprising:
     a rotary member;
     an actuator attached to said rotary member;
     a suction tip vertically movably driven by said actuator;
     a rotary drive means for driving said rotary member such that said suction tip is moved between a seed-attracting position and a seed-releasing position; and
     a seed vessel containing seeds to be attracted to said suction tip, wherein said seed vessel is disposed corresponding to said seed-attracting position;
   said gel-discharging mechanism, which is disposed corresponding to said seed-releasing position, comprising:
     a gel flow channel filled with a gel;
     a piston-insertion hole communicating with said gel flow channel;
     a piston reciprocatably inserted into said piston-insertion hole, wherein said piston, when moving in a forward direction, pressurizes said gel inside of said gel flow channel and, when moving in a rearward direction, causes an additional gel to flow into said gel flow channel;
     a nozzle plunger with a hollow portion axially extended therethrough, wherein said nozzle plunger opens a valve when said gel inside of said gel flow channel is pressurized to allow said gel to be discharged, a portion of said gel which has been discharged dropping by said gel's own weight and a remainder of said gel which has been discharged forming a layer of said gel that closes said hollow portion at a lower end thereof;
     a drive means for reciprocating said piston, wherein at said seed-attracting position said suction tip vacuum-attracts a seed from said seed vessel of said seed-supplying mechanism and at said seed-releasing position, said suction tip is moved downwardly by said actuator into said hollow portion of said nozzle plunger to release said seed attracted thereto on said layer of said gel; and wherein said suction tip is located at a position inside of said hollow portion of said nozzle plunger so that a front end thereof is close to, but kept apart from, said layer of said gel.

2. The apparatus for producing encapsulated seeds according to claim 1, wherein said suction tip is located out of contact with said seed and said seed is located at a position inside of said hollow portion of said nozzle plunger, said position of said seed being just above a nozzle tip of said nozzle plunger.

3. The apparatus for producing encapsulated seeds according to claim 1, further comprising a plurality of actuators in addition to said actuator, wherein each actuator of said plurality of actuators is attached to said rotary member at a position symmetrical relative to an axis of rotation of said rotary member, and a plurality of suction tips in addition to said suction tip, wherein each suction tip of said plurality of suction tips are individually upwardly and downwardly driven by a corresponding actuator of said plurality of actuators.

4. The apparatus for producing encapsulated seeds according to claim any one of claims 1, 2, and 3, wherein when said suction tip is located in said hollow portion of said nozzle plunger at said seed-releasing position so that a negative pressure inside said suction tip is replaced by a positive pressure to release said seed.

5. The apparatus for producing encapsulated seeds according to claim 1, wherein said seed vessel comprises an opening through which said suction tip advances thereinto and an air injection nozzle for injecting air to float seeds inside of said seed vessel, and a netted opening through which air passes to an outside of said seed vessel.

* * * * *